US012631796B2

(12) United States Patent
Kashiwagi

(10) Patent No.: US 12,631,796 B2
(45) Date of Patent: May 19, 2026

(54) OPTICAL SHEET AND METHOD OF MANUFACTURING THE SAME

(71) Applicant: Dai Nippon Printing Co., Ltd., Tokyo (JP)

(72) Inventor: Tsuyoshi Kashiwagi, Tokyo (JP)

(73) Assignee: Dai Nippon Printing, Co., Ltd., Nagoya (JP)

( * ) Notice: Subject to any disclaimer, the term of this patent is extended or adjusted under 35 U.S.C. 154(b) by 905 days.

(21) Appl. No.: 17/754,067

(22) PCT Filed: Sep. 25, 2020

(86) PCT No.: PCT/JP2020/036403
§ 371 (c)(1),
(2) Date: Mar. 23, 2022

(87) PCT Pub. No.: WO2021/060514
PCT Pub. Date: Apr. 1, 2021

(65) Prior Publication Data
US 2022/0350053 A1    Nov. 3, 2022

(30) Foreign Application Priority Data
Sep. 25, 2019    (JP) ................................. 2019-174634

(51) Int. Cl.
*G02B 1/14*        (2015.01)
*G02B 5/00*        (2006.01)
(52) U.S. Cl.
CPC ............... *G02B 1/14* (2015.01); *G02B 5/003* (2013.01); *G02B 2207/123* (2013.01)
(58) Field of Classification Search
None
See application file for complete search history.

(56) References Cited

U.S. PATENT DOCUMENTS

2002/0068168 A1    6/2002    Kugimoto
2007/0211002 A1*   9/2007    Zehner ................... G02F 1/1679
                                                      345/84
(Continued)

FOREIGN PATENT DOCUMENTS

CN        111919167 A  * 11/2020  ............... F02K 9/28
JP        H06-273617 A      9/1994
(Continued)

OTHER PUBLICATIONS

Japanese Office Action (with English translation) dated Sep. 3, 2024 (Application No. 2024-026685).
(Continued)

*Primary Examiner* — Bao-Luan Q Le
*Assistant Examiner* — Danell L Owen
(74) *Attorney, Agent, or Firm* — BURR PATENT LAW, PLLC

(57)        ABSTRACT

An optical sheet 1 includes an optical function film 10 and protection films 20. The optical function film 10 includes an optical function layer 11. The optical function layer 11 includes optical-element portions that are of two or more different kinds and are arrayed in one direction. The protection films 20 each include a protection layer 21 and an adhesive layer 22. The protection films 20 are peelably provided on a pair of major surfaces of the optical function film with the adhesive layer 22. The protection films 20 extend externally beyond at least a part of the periphery of the optical function film 10. In the protection films, a portion that is beyond at least the part of the periphery of the optical function film 10 includes a portion of the adhesive layer 22.

13 Claims, 10 Drawing Sheets

(56)                    References Cited

U.S. PATENT DOCUMENTS

| | | | |
|---|---|---|---|
| 2010/0133419 A1 | 6/2010 | Suetake | |
| 2010/0214506 A1* | 8/2010 | Gaides ................. | G02B 5/3066 |
| | | | 359/888 |
| 2015/0240134 A1 | 8/2015 | Keite-Telgenbüscher et al. | |

FOREIGN PATENT DOCUMENTS

| | | | |
|---|---|---|---|
| JP | H08-201619 A | | 8/1996 |
| JP | 2002-169226 A | | 6/2002 |
| JP | 2007-279424 A | | 10/2007 |
| JP | 2009122187 A | * | 6/2009 |
| JP | 2010-129989 A | | 6/2010 |
| JP | 2010-217871 A | | 9/2010 |
| JP | 2012008320 A | * | 1/2012 |
| JP | 2012-204731 A | | 10/2012 |
| JP | 2013-076828 A | | 4/2013 |
| JP | 2013159099 A | * | 8/2013 |
| JP | 2014-089376 A | | 5/2014 |
| JP | 2015-531807 A | | 11/2015 |
| JP | 2017-152516 A | | 8/2017 |
| KR | 10-2012-0076066 A | | 7/2012 |
| KR | 10-2015-0085352 A | | 7/2015 |
| KR | 10-2018-0003394 A | | 1/2018 |
| WO | 2007/118122 A2 | | 10/2007 |

OTHER PUBLICATIONS

Chinese Office Action (with English translation) dated Aug. 28, 2024 (Application No. 202080063569.6).
Japanese Office Action (Application No. 2019-174634) dated Aug. 15, 2023 (with English translation) (20 pages).
Chinese Office Action (Application No. 202080063569.6) dated Mar. 21, 2024 (with English translation) (15 pages).
International Search Report and Written Opinion (Application No. PCT/JP2020/036403) dated Dec. 8, 2020 (with English translation).
English translation of the International Preliminary Report on Patentability (Chapter I) dated Apr. 7, 2022 (Application No. PCT/JP2020/036403).
Japanese Office Action (Application No. 2019-174634) dated Oct. 27, 2023 (with English translation) (7 pages).
Japanese Office Action (with English translation) dated Nov. 22, 2024 (Application No. 2024-026685).
Korean Office Action (Application No. 10-2022-7012989) dated Apr. 24, 2025 (with English translation) (14 pages).

* cited by examiner

1

OPTICAL SHEET AND METHOD OF MANUFACTURING THE SAME

TECHNICAL FIELD

The present disclosure relates to an optical sheet including an optical function film and a protection film and to a method of manufacturing the same.

BACKGROUND ART

It has been known that optical function films are included in image display apparatuses such as liquid-crystal display apparatuses and give optical effects to image light generated by the image display apparatuses.

Typically, protection films have been attached to optical function films to be set in image display apparatuses. The protection films protect the optical function films from impact, contamination, or other incidents that may occur during, for example, transportation and storage. In general, a protection film is peelably attached to an optical function film with an easily peelable adhesive layer interposed therebetween so that the protection film can be removed when the optical function film is set in an image display apparatus.

JP2013-76828A discloses an optical sheet including a louver film serving as an optical function film, and a protection film that protects the louver film. The louver film has a multilayer structure including an optical function layer, a base layer, and a protection layer. The optical function layer includes light-absorbing portions and light-transmitting portions that are alternately arrayed. The base layer supports the optical function layer. The protection layer is provided on a surface of the base layer opposite from a side where the optical function layer is provided. The protection film includes a protection layer and an adhesive layer and is provided on the optical function film with the adhesive layer.

The optical sheet disclosed by JP2013-76828A is obtained by cutting a multilayer sheet with a cutting die or the like into a piece having a predetermined size. The multilayer sheet includes a louver-film portion and a protection-film portion that are placed one on top of the other. The louver-film portion has a multilayer structure including an optical function layer, a base layer, and a protection layer. The protection-film portion includes a protection layer and an adhesive layer.

In the above cutting process, it may be difficult to obtain smooth end faces of the louver film. This is because the louver-film portion includes a plurality of layers, and the optical function layer thereof includes the light-absorbing portions and the light-transmitting portions that are made of different materials. The technique disclosed by JP2013-76828A aims to obtain smooth end faces of the louver film by contriving a cutting method.

SUMMARY OF INVENTION

As described above, it is difficult to cut the louver film to have smooth end faces. End faces that are not smooth tend to include some part that has been torn up, resulting in holes or burrs that may fall off at any moment. Such holes and burrs tend to be formed because of a large pressure locally applied to the louver film from a cutter (such as a cutting die). The holes and burrs deteriorate the appearance of the louver film.

Moreover, the burrs generated as above may fall off when or after the louver film is set in an image display apparatus. In that event, the burrs are regarded as foreign matter in the image display apparatus and may bring an adverse effect to the performance of the apparatus.

The present disclosure has been conceived in view of the above circumstances, and the object of the present disclosure is to provide an optical sheet and a method of manufacturing the same with a reduced probability of foreign matter possibly generated from an optical function film unwantedly scattering, for example, inside an image display apparatus.

An optical sheet according to the present disclosure includes an optical function film including an optical function layer, the optical function layer including optical-element portions that are of two or more different kinds and are arrayed in one direction; and a protection film including a protection layer and an adhesive layer, the protection film being peelably provided on at least one of a pair of major surfaces of the optical function film with the adhesive layer. The protection film extends externally beyond at least a part of a periphery of the optical function film. In the protection film, a portion that is beyond at least the part of the periphery of the optical function film includes a portion of the adhesive layer.

The protection film may extend externally beyond an entirety of the periphery of the optical function film.

The protection film may be one of a pair of protection films that are respectively provided on the pair of major surfaces of the optical function film. A periphery of one of the pair of protection films and a periphery of another of the pair of protection films may be peelably joined to each other.

In such a case, the periphery of the one of the protection films may extend externally beyond the periphery of the other of the protection films.

The protection film may extend beyond the periphery of the optical function film within a range between 1 mm and 100 mm inclusive.

The optical function film may have a thickness of 0.2 mm or greater and 0.6 mm or smaller.

The protection film may have a Young's modulus of 20 MPa or higher and 110 MPa or lower.

The protection film may have a flexural rigidity of 1000 $MPa \cdot m^4$ or higher and 2000 $MPa \cdot m^4$ or lower.

The optical function film may be a louver film, and the optical-element portions may include light-absorbing portions and light-transmitting portions that are alternately arrayed.

In such a case, the light-absorbing portions may each contain a base resin and light-absorbing particles that are held by the base resin.

The optical function film may include a base and the optical function layer that are stacked in an order listed.

The optical function film may include a first base, a reflective polarization layer, a bonding layer, the optical function layer, and a second base that are stacked in an order listed.

The optical-element portions may each extend linearly in a direction different from the one direction. The optical function film may have a quadrangular shape defined by a pair of first sides that are parallel to each other and a pair of second sides that are parallel to each other, and the direction different from the one direction is parallel to neither the first sides nor the second sides.

A method of manufacturing an optical sheet according to the present disclosure includes:

a step of preparing an optical function film including an optical function layer, the optical function layer including optical-element portions that are of two or more different kinds and are arrayed in one direction;

a step of preparing a protection film including a protection layer and an adhesive layer; and a step of peelably attaching the protection film to at least one of a pair of major surfaces of the optical function film with the adhesive layer.

The protection film is attached such that the protection film extends externally beyond at least a part of a periphery of the optical function film.

In the protection film, a portion that is beyond at least the part of the periphery of the optical function film includes a portion of the adhesive layer.

The step of preparing the optical function film may be performed by cutting the optical function film from a multilayer sheet including the optical function layer such that the optical function film has a quadrangular shape.

The optical-element portions may each extend linearly in a direction different from the one direction.

The optical function film may be cut from the multilayer sheet such that the quadrangular shape of the optical function film is defined by a pair of first sides that are parallel to each other and a pair of second sides that are parallel to each other, and such that the direction different from the one direction is parallel to neither the first sides nor the second sides.

A method of manufacturing an optical sheet according to the present disclosure includes:

a step of making a multilayer sheet in which an optical function layer and an initial protection layer are stacked, the optical function layer including optical-element portions that are of two or more different kinds and are arrayed in one direction;

a step of cutting an optical function film from the multilayer sheet, the optical function film including the optical function layer and the initial protection layer;

a step of preparing a protection film including a protection layer and an adhesive layer; and a step of peelably attaching, after the initial protection layer is removed, the protection film to at least one of a pair of major surfaces of the optical function film with the adhesive layer.

The protection film is attached such that the protection film extend externally beyond at least a part of a periphery of the optical function film.

In the protection film, a portion that is beyond at least the part of the periphery of the optical function film includes a portion of the adhesive layer.

According to the present disclosure, the probability of foreign matter possibly generated from the optical function film unwantedly scattering, for example, inside an image display apparatus is reduced.

4

Figure 1:
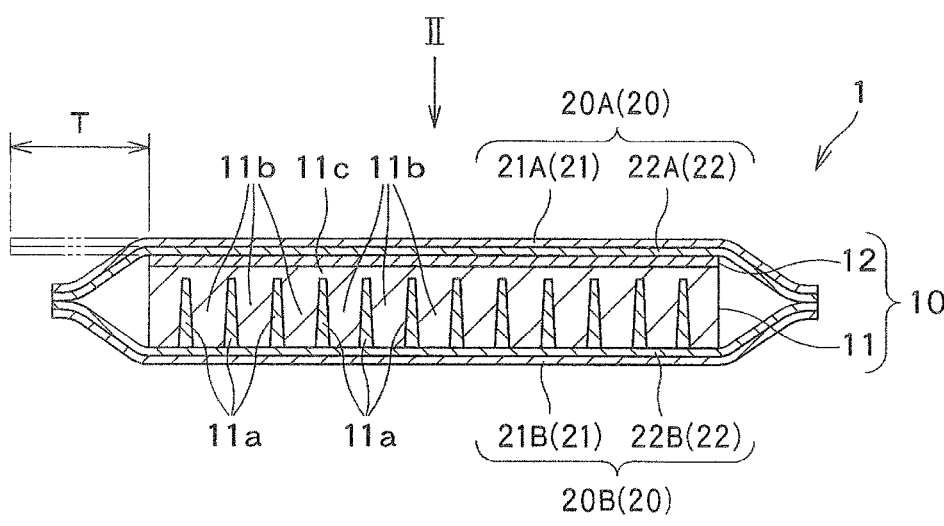
FIG. 1 is a schematic sectional view of an optical sheet according to an embodiment of the present disclosure, illustrating a configuration of layers thereof.
Figure 4A:
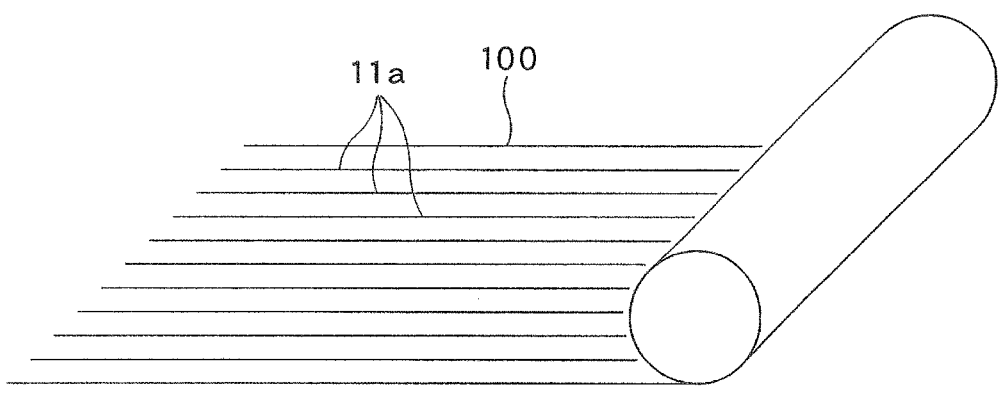

FIG. 4A illustrates the exemplary method of manufacturing the optical sheet illustrated in FIG. 1.

Figure 4B:
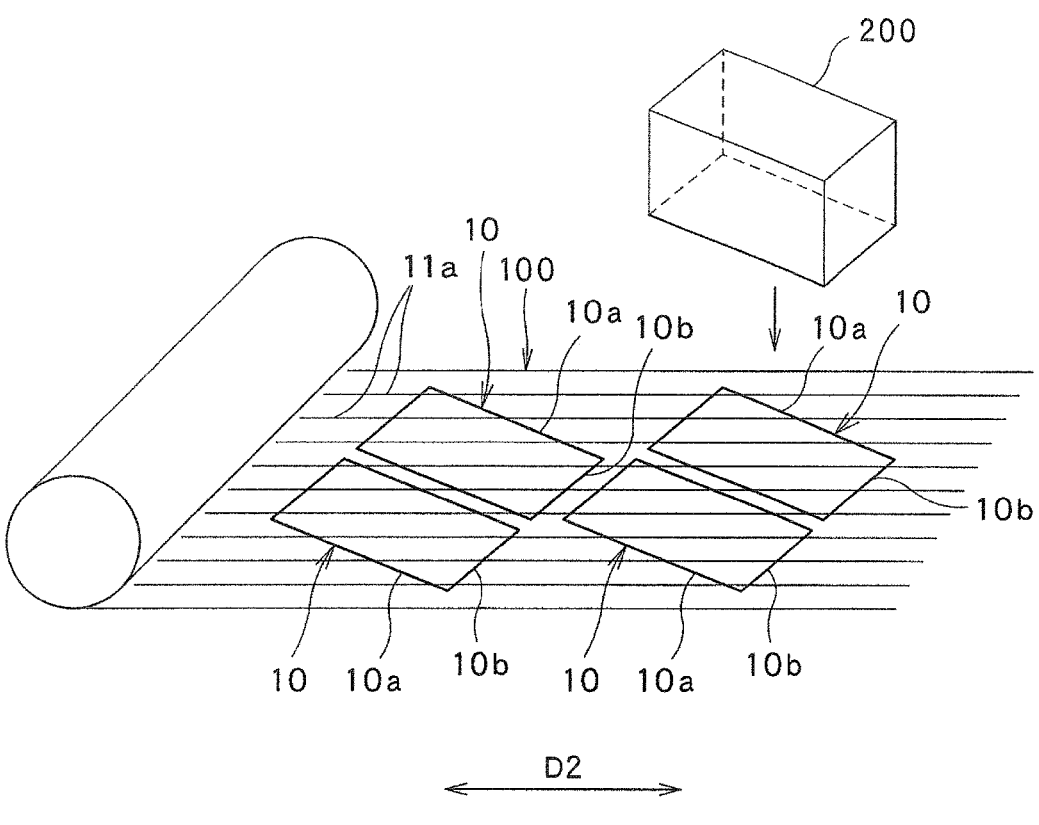

FIG. 4B illustrates the exemplary method of manufacturing the optical sheet illustrated in FIG. 1.

Figure 5A:
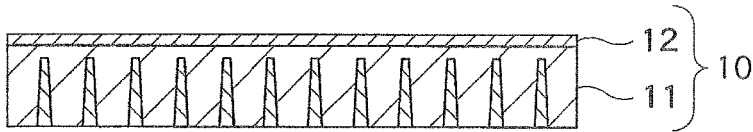

FIG. 5A illustrates the exemplary method of manufacturing the optical sheet illustrated in FIG. 1.

Figure 5B:
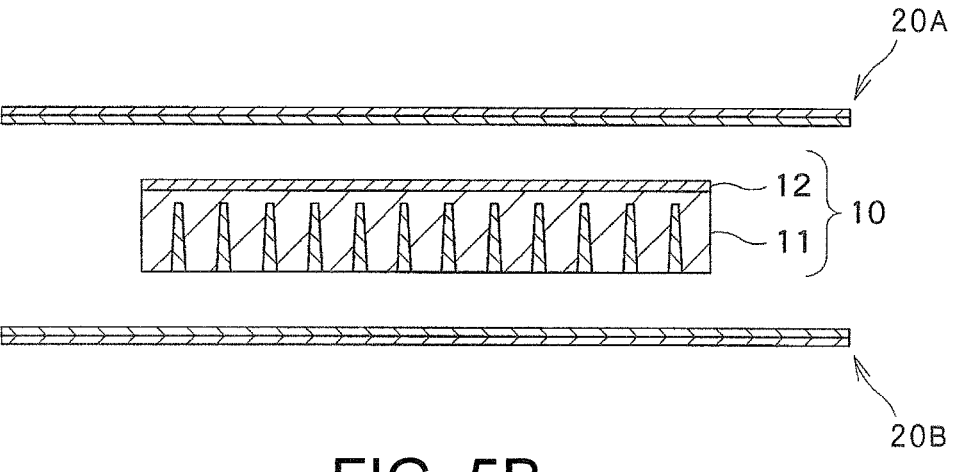

FIG. 5B illustrates the exemplary method of manufacturing the optical sheet illustrated in FIG. 1.

Figure 5C:
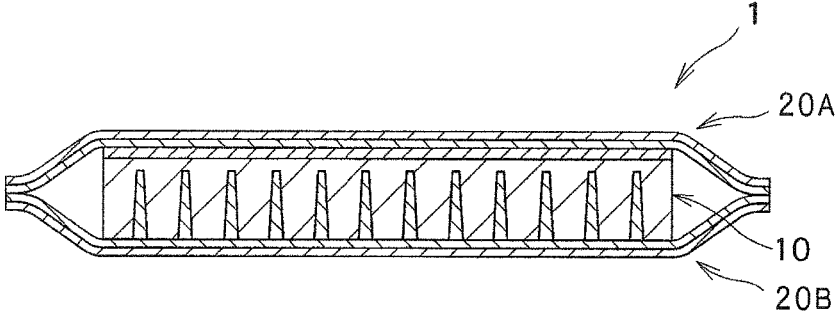

FIG. 5C illustrates the exemplary method of manufacturing the optical sheet illustrated in FIG. 1.

Figure 6:
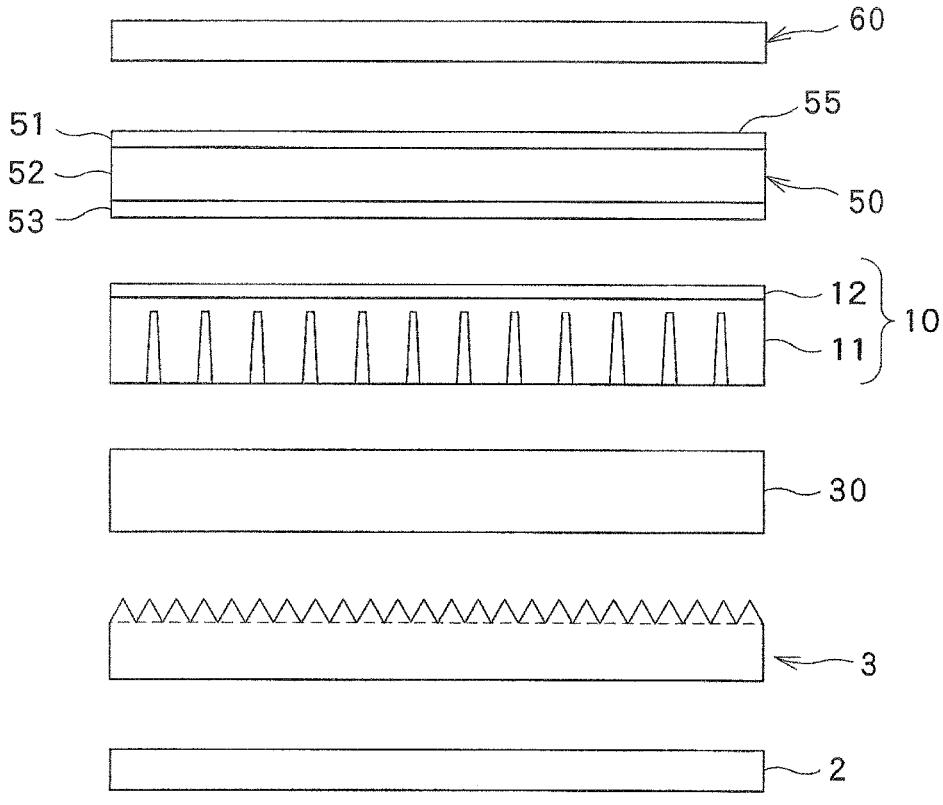

FIG. 6 schematically illustrates a liquid-crystal display apparatus including an optical function film included in the optical sheet illustrated in FIG. 1.

Figure 7:
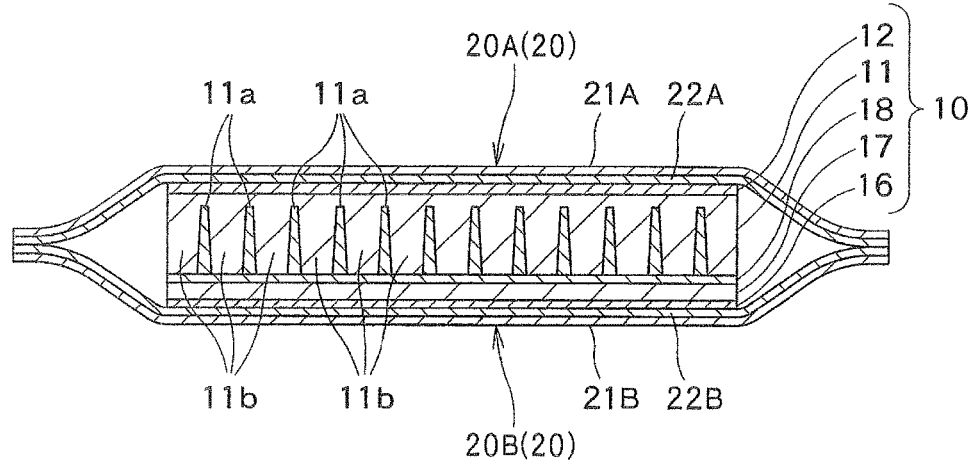

FIG. 7 illustrates a modification of the optical sheet illustrated in FIG. 1.

Figure 8:
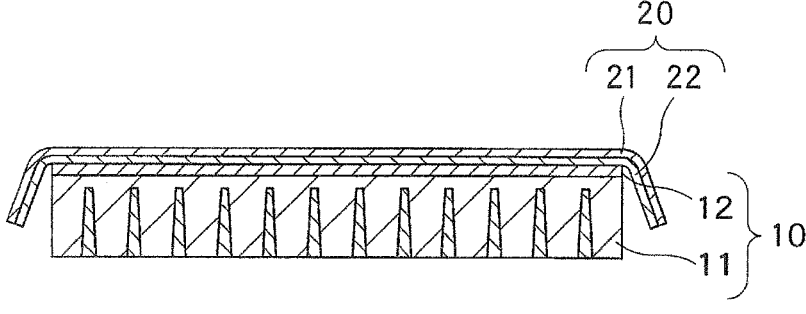

FIG. 8 illustrates a modification of the optical sheet illustrated in FIG. 1.

Figure 9:
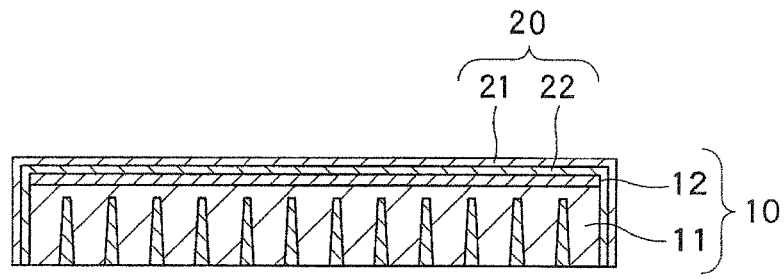

FIG. 9 illustrates a modification of the optical sheet illustrated in FIG. 1.

Figure 10:
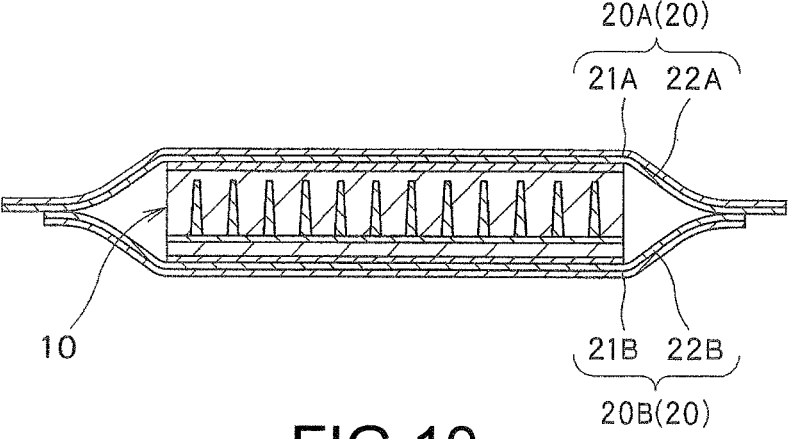

FIG. 10 illustrates a modification of the optical sheet illustrated in FIG. 1.

Figure 11:
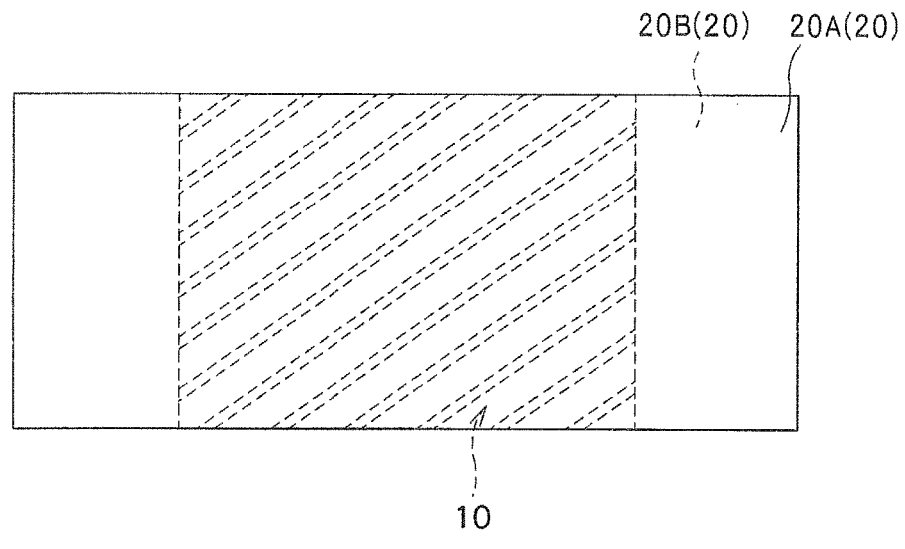

FIG. 11 illustrates a modification of the optical sheet illustrated in FIG. 1.

Figure 12:
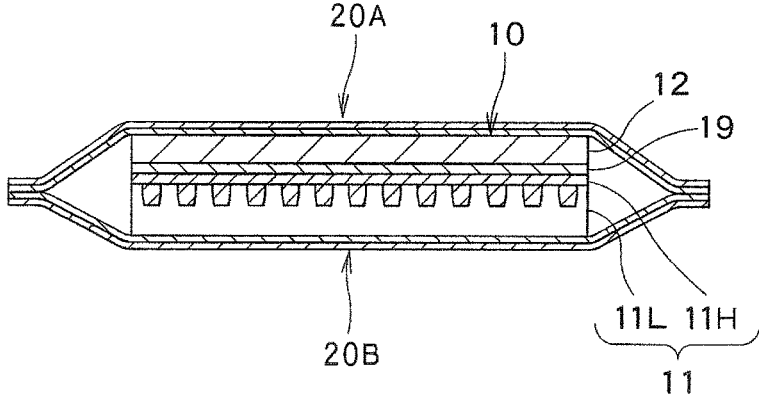

FIG. 12 illustrates a modification of the optical sheet illustrated in FIG. 1.

Figure 13A:
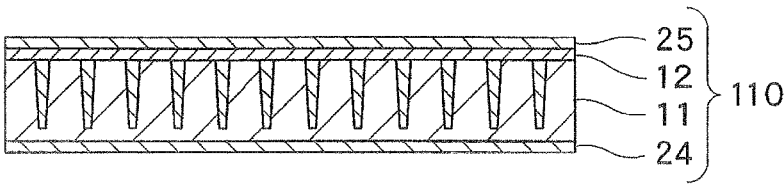

FIG. 13A illustrates a modification of the method of manufacturing the optical sheet illustrated in FIG. 1.

Figure 13B:
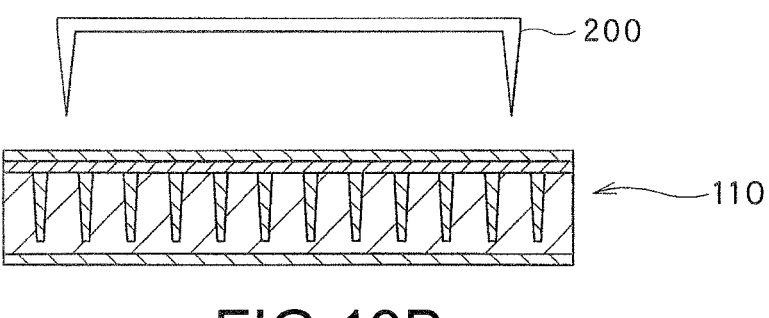

FIG. 13B illustrates the modification of the method of manufacturing the optical sheet illustrated in FIG. 1.

Figure 13C:
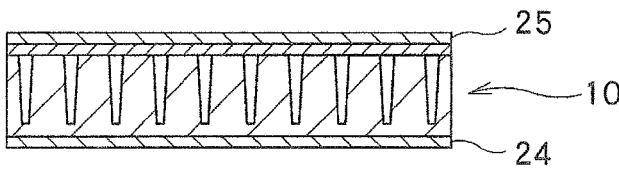

FIG. 13C illustrates the modification of the method of manufacturing the optical sheet illustrated in FIG. 1.

Figure 13D:
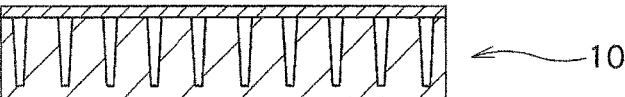

FIG. 13D illustrates the modification of the method of manufacturing the optical sheet illustrated in FIG. 1.

Figure 13E:
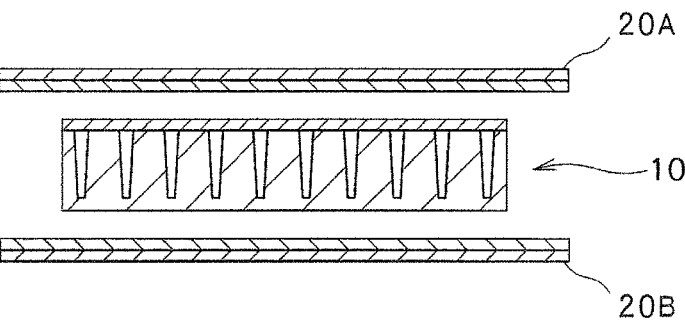

FIG. 13E illustrates the modification of the method of manufacturing the optical sheet illustrated in FIG. 1.

DESCRIPTION OF EMBODIMENTS

An optical sheet 1 and a method of manufacturing the same according to an embodiment of the present disclosure are described with reference to the drawings. For easy illustration and understanding, the drawings attached to this specification are not necessarily to scale, with some changes and exaggeration from the actual scale.

In this specification, the terms "plate", "sheet", and "film" should not be distinguished from one another only by the difference in the names of relevant elements. For example, the term "optical sheet" is a concept including such element that can be referred to as "plate" or "film". That is, an "optical sheet" is not distinguished from an element referred to as "optical film" or the like only by the difference in their names.

The term "sheet surface (plate surface or film surface)" refers to a surface of a sheet-type (plate-type or film-type) element that is being discussed, and the surface spreads in the planar direction of that sheet-type (plate-type or film-type) element when the element is viewed as a whole and generally. A line normal to a sheet surface represents a line orthogonal to the sheet surface. A direction parallel to the line normal to the sheet surface represents the normal direction.

In this specification, terms used to specify factors such as shape or geometrical conditions and the extent of such factors: for example, "parallel"; "orthogonal"; "equal"; and so forth, and values and other numbers representing factors such as length and angle should be understood without being bound by strict meanings thereof but within a range where equivalent functions are expected to be achieved.

<Optical Sheet>

Figure 2:
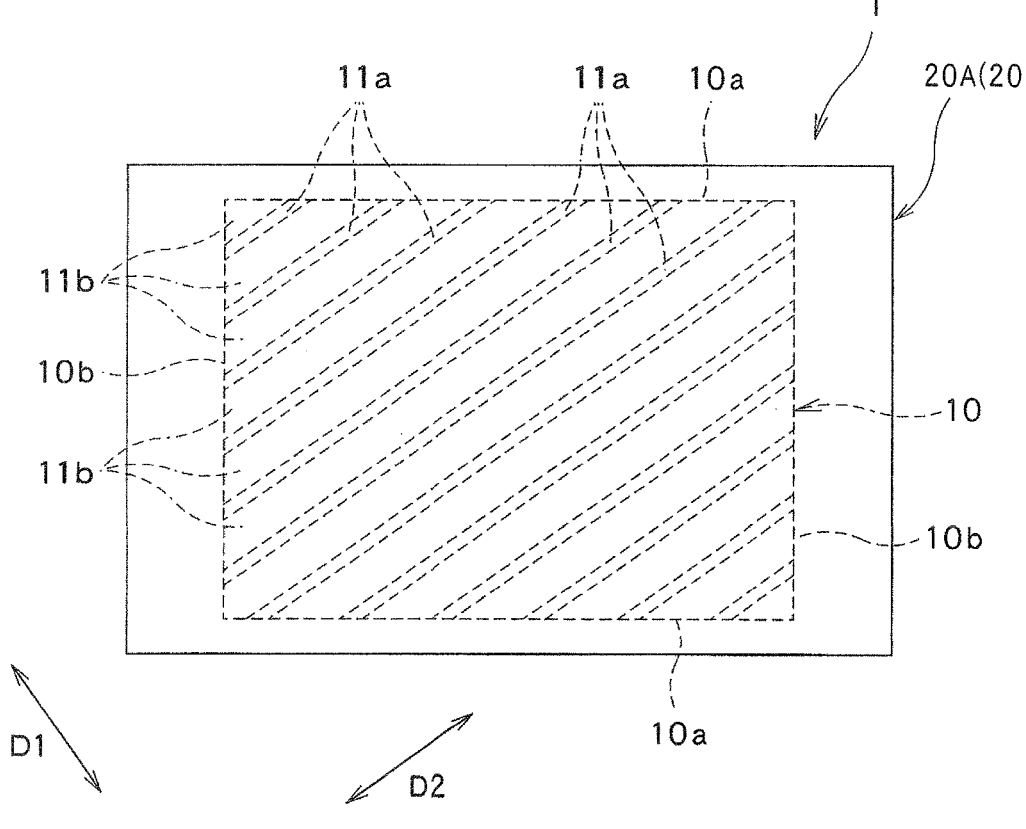
FIG. 2 is a plan view of the optical sheet illustrated in FIG. 1, seen in a direction of arrow II illustrated in FIG. 1.

FIG. 1 is a schematic sectional view of an optical sheet 1 according to the present embodiment, illustrating a configuration of layers thereof. FIG. 2 is a plan view of the optical sheet 1, seen in a direction of arrow II illustrated in FIG. 1. The optical sheet 1 according to the present embodiment illustrated in FIGS. 1 and 2 includes an optical function film 10 and a pair of protection films 20. The optical function film 10 includes an optical function layer 11. The optical function layer 11 includes optical-element portions that are of two or more different kinds and are arrayed in one direction. The protection films 20 each include a protection layer 21 and an adhesive layer 22. The protection film 20 is peelably provided on at least one (in the present embodiment, both) of a pair of major surfaces of the optical function film 10 with the adhesive layer 22, namely, such that the adhesive layer 22 faces the optical function film 10.

Hereinafter, the protection film 20 provided on one (the upper one in FIG. 1) of the pair of major surfaces of the optical function film 10 is denoted as "first protection film 20A", and the protection layer 21 and the adhesive layer 22 included in the first protection film 20A are denoted as "first protection layer 21A" and "first adhesive layer 22A", respectively. Furthermore, the protection film 20 provided on the other (the lower one) of the pair of major surfaces of the optical function film 10 is denoted as "second protection film 20B", and the protection layer 21 and the adhesive layer 22 included in the second protection film 20B are denoted as "second protection layer 21B" and "second adhesive layer 22B", respectively.

The optical function film 10 according to the present embodiment is a louver film and includes the optical function layer 11 and a base 12 (substrate). The optical function layer 11 forms a film that includes light-absorbing portions 11a and light-transmitting portions 11b, which serve as the optical-element portions that are of different kinds and are alternately arrayed along the film surface of the optical function film 10. The base 12 is provided on one of a pair of major surfaces of the optical function layer 11. A major surface of the base 12 that is on the outer side forms one of the major surface of the optical function film 10. The first protection film 20A is provided on the major surface of the optical function film 10 that is formed by the outer-side major surface of the base 12. The optical function film 10 according to the present embodiment, which has a two-layer structure formed of the optical function layer 11 and the base 12, may include an additional function layer.

In the optical function layer 11, the light-absorbing portions 11a and the light-transmitting portions 11b are alternately arrayed in a first direction D1 as illustrated in FIG. 2, and each extend linearly in a second direction D2, which is orthogonal to the first direction D1. As illustrated by broken lines in FIG. 2, the optical function film 10 has a pair of first sides 10a, which are parallel to each other; and a pair of second sides 10b, which are parallel to each other, thereby forming a quadrangular shape. In other words, the optical function film 10 has a quadrangular shape defined by four sides: the pair of first sides 10a that are parallel to each other and the pair of second sides 10b that are parallel to each other. The second direction D2 is parallel to neither the first sides 10a nor the second sides 10b.

The optical function film 10 is to be set in, for example, a liquid-crystal display apparatus such that the optical function film 10 having the quadrangular shape is positioned parallel to a quadrangular liquid-crystal panel. In such a case, if the second direction D2 in which the light-absorbing portions 11a and the light-transmitting portions 11b extend linearly is parallel to each of the first sides 10a and the second sides 10b, moire may occur in relation to pixel arrangement. Therefore, the light-absorbing portions 11a and the light-transmitting portions 11b according to the present embodiment are arranged on the bias. The second direction D2 may, however, be parallel to the first sides 10a or the second sides 10b.

The light-absorbing portions 11a absorb light. The light-absorbing portions 11a according to the present embodiment each contain a substance obtained by mixing (dispersing) a black filler, for example, into a base resin (i.e., a binder resin). The light-absorbing portions 11a may contain light-absorbing particles in the base resin (i.e., the binder resin). The light-absorbing particles may be, for example, acrylic beads containing carbon black. The black filler or light-absorbing particles contained in the binder resin are not cross-linked with the binder resin.

The light-absorbing portions 11a may have any sectional shape determined from various shapes in accordance with the function required thereto. In the present embodiment, as illustrated in FIG. 1, the light-absorbing portions 11a each have a trapezoidal sectional shape that is tapered toward a side from which light exits. The light-transmitting portions 11b each have a trapezoidal sectional shape that is tapered toward a side from which light enters. The sectional shapes of the light-absorbing portions 11a and the light-transmitting portions 11b are not specifically limited and may be quadrangular shapes.

The material for the base resin of the light-absorbing portions 11a is not specifically limited but is preferably a curable resin. Examples of the curable resin include the following: an ionizing-radiation-curable resin that is curable with ultraviolet light or an electron beam; a mixture of an ionizing-radiation-curable resin and a solvent-drying resin (a resin to which a solvent is added for adjusting the solid content and that forms a film when the solvent is simply dried after application); and a thermosetting resin. The base resin of the light-absorbing portions 11a has a refractive index of preferably 1.47 or higher and 1.65 or lower, more preferably 1.49 or higher and 1.57 or lower. If the refractive index of the base resin is high, the light-absorbing portions 11a tend to be broken easily. Therefore, the refractive index is preferably 1.57 or lower.

The light-transmitting portions 11b transmit light. The light-transmitting portions 11b are made of, for example, a resin that transmits visible light. The material for the light-transmitting portions 11b is not specifically limited but is preferably a curable resin. Examples of the curable resin include the following: an ionizing-radiation-curable resin that is curable with ultraviolet light or an electron beam; a mixture of an ionizing-radiation-curable resin and a solvent-drying resin (a resin to which a solvent is added for adjusting the solid content and that forms a film when the solvent is simply dried after application); and a thermosetting resin.

The light-transmitting portions 11b have a refractive index of preferably 1.47 or higher and 1.65 or lower, more preferably 1.49 or higher and 1.57 or lower. If the refractive index is high, the light-transmitting portions 11b tend to be broken easily. Therefore, the refractive index is preferably 1.57 or lower. Furthermore, the refractive index of the light-transmitting portions 11b is desired to be higher than or equal to the refractive index of the base resin of the light-absorbing portions 11a. A refractive index of the light-transmitting portions 11b that is higher than the refractive index of the base resin of the light-absorbing portions 11a enables an optical design utilizing the total reflection of light traveling from the light-transmitting portions 11*b* toward the light-absorbing portions 11*a*, which is advantageous in, for example, increasing the efficiency of light utilization. A refractive index of the light-transmitting portions 11*b* that is equal to the refractive index of the base resin of the light-absorbing portions 11*a* causes neither total reflection nor refraction of light. Therefore, even if, for example, there is a long distance between the surface of the display apparatus and the optical function film 10, occurrence of a double image that may be formed of light traveling through and light totally reflected or refracted can be prevented.

The pitch of arrangement of the light-absorbing portions 11*a* and the light-transmitting portions 11*b* in the optical function layer 11 is not specifically limited but is preferably 15 μm or greater and 100 μm or smaller, more preferably 30 μm or greater and 100 μm or smaller, in view of the effectiveness of the function as a louver film. The light-absorbing portions 11*a* has a height (thickness) of preferably 60 μm or greater and 150 μm or smaller, more preferably 60 μm or greater and 150 μm or smaller. The optical function layer 11 further includes a land portion 11*c*, which is a film continuously connected to the light-transmitting portions 11*b* in such a manner as to support the light-transmitting portions 11*b* altogether. The land portion 11*c* has a thickness of preferably 10 μm or greater and 50 μm or smaller.

The base 12 is a transparent base member made of a light-transmissive material such as resin or glass. The base 12 is made of a film whose chief component is, for example, triacetylcellulose (TAC), polyethylene terephthalate (PET), polyolefin, polycarbonate, polyacrylate, or polyamide; glass; or the like. The base 12 has a thickness of, for example, 60 μm or greater and 250 μm or smaller. The base 12 has a refractive index of, for example, 1.46 or higher and 1.67 or lower. Note that the chief component refers to one of a plurality of components of a substance and takes a 50% or higher or the highest content of the whole substance.

Next, the first protection film 20A and the second protection film 20B are provided for protecting the optical function film 10 from impact, contamination, or other incidents that may occur during transportation and storage. The first protection film 20A and the second protection film 20B are to be removed when the optical function film 10 is set in, for example, a liquid-crystal display apparatus. As illustrated in FIGS. 1 and 2, the first protection film 20A and the second protection film 20B according to the present embodiment each extend externally beyond the entire periphery of the optical function film 10. In the first protection film 20A, the first adhesive layer 22A spreads over the entirety of a major surface of the first protection layer 21A. Likewise, in the second protection film 20B, the second adhesive layer 22B spreads over the entirety of a major surface of the second protection layer 21B. Accordingly, the portion of the first protection film 20A that is beyond the periphery of the optical function film 10 includes a portion of the first adhesive layer 22A, and the portion of the second protection film 20B that is beyond the periphery of the optical function film 10 includes a portion of the second adhesive layer 22B.

Such first protection film 20A and second protection film 20B that each extend externally beyond the entire periphery of the optical function film 10 and respectively cover the two major surfaces of the optical function film 10 effectively protect the optical function film 10. Particularly in the present embodiment, as illustrated in FIG. 1, the periphery of the first protection film 20A and the periphery of the second protection film 20B are peelably joined to each other, whereby the reliability of the protecting function is further improved. The periphery of the first protection film 20A and the periphery of the second protection film 20B may, however, be apart from each other.

FIG. 1 illustrates an extension amount T, by which the first protection film 20A extends beyond the optical function film 10 in a direction parallel to the film surface of the first protection film 20A. The present embodiment is based on a case where, for example, the optical function film 10 has a thickness of 0.2 mm or greater and 0.6 mm or smaller. In such a case, the extension amount T is preferably within a range between 1 mm and 100 mm inclusive, more preferably 1 mm or greater and 10 mm or smaller, so that the entirety or most part of the periphery of the optical function film 10 can be covered by the first protection film 20A. The above preferable range of the extension amount T applies to every part of the periphery of the optical function film 10. That is, the first protection film 20A and the second protection film 20B each preferably extend beyond the periphery of the optical function film 10 in part of or over the entirety of the periphery within a range between 1 mm and 100 mm inclusive, particularly 1 mm or greater and 10 mm or smaller. The extension amount T may, however, be smaller than 1 mm or greater than 100 mm.

The first protection film 20A and the second protection film 20B each have a Young's modulus of preferably 20 MPa or higher and 110 MPa or lower, or a flexural rigidity of preferably 1000 MPa·m$^4$ or higher and 2000 MPa·m$^4$ or lower. Within such a range, the first protection film 20A and the second protection film 20B are flexible enough to cover the end faces of the optical function film 10.

The materials for the first protection layer 21A and the second protection layer 21B included in the first protection film 20A and the second protection film 20B are not specifically limited but are each preferably a film or the like whose chief component is a relatively flexible material such as polyethylene or polypropylene, in view of the flexibility of the first protection film 20A and the second protection film 20B.

The materials for the first adhesive layer 22A and the second adhesive layer 22B are not specifically limited but may each be, for example, an acrylic-based adhesive, a silicone-based adhesive, a urethane-based adhesive, or a rubber-based adhesive. The first adhesive layer 22A and the second adhesive layer 22B each have an adhesive force of preferably 0.05 N/25 mm or greater and 0.2 N/25 mm or smaller.

The first protection film 20A and the second protection film 20B each have a thickness of preferably 25 μm or greater and 150 μm or smaller. The first protection layer 21A and the second protection layer 21B each have a thickness of preferably 20 μm or greater and 100 μm or smaller. The first adhesive layer 22A and the second adhesive layer 22B each have a thickness of preferably 5 μm or greater and 50 μm or smaller.

<Method of Manufacturing Optical Sheet>

An exemplary method of manufacturing the above optical sheet 1 is described with reference to FIGS. 3A to 3D, FIGS. 4A and 4B, and FIGS. 5A to 5C.

Figure 3A:
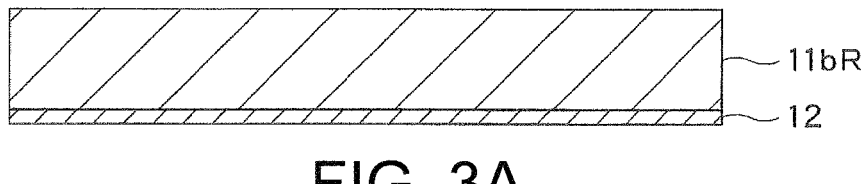
FIG. 3A illustrates an exemplary method of manufacturing the optical sheet illustrated in FIG. 1.

The exemplary method starts with making a multilayer sheet 100, which includes the optical function layer 11 and the base 12. In this step, as illustrated in FIG. 3A, a light-transmitting-portion material layer 11*b*R is first formed on a base 12. The light-transmitting-portion material layer 11*b*R is formed from, for example, a curable resin that is yet to be cured. The light-transmitting-portion material layer 11*b*R may be formed as a continuous layer by applying the material to the base 12, which is fed from a roll.

Figure 3B:
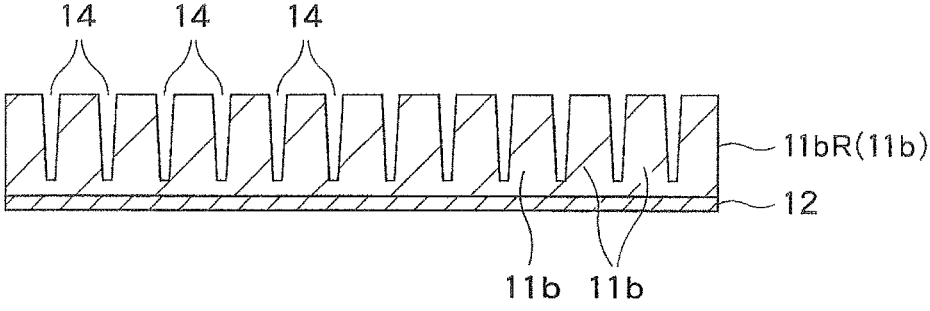
FIG. 3B illustrates the exemplary method of manufacturing the optical sheet illustrated in FIG. 1.

Subsequently, as illustrated in FIG. 3B, recesses 14 are provided in the light-transmitting-portion material layer 11bR by using a die. The recesses 14 are provided for forming the light-absorbing portions 11a. The die may be a roll die. Then, the light-transmitting-portion material layer 11bR is cured, whereby the light-transmitting portions 11b are obtained between adjacent ones of the recesses 14.

Figure 3C:
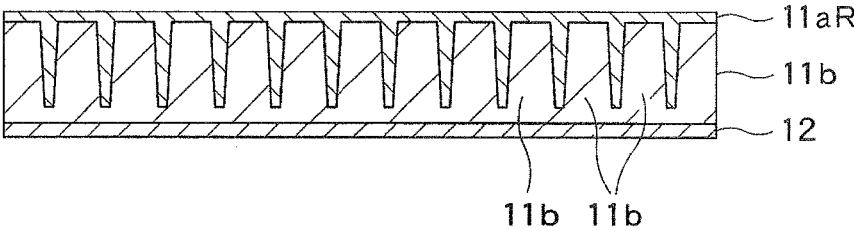
FIG. 3C illustrates the exemplary method of manufacturing the optical sheet illustrated in FIG. 1.

Subsequently, as illustrated in FIG. 3C, a light-absorbing-portion material layer 11aR is formed in such a manner as to fill the recesses 14 and to spread over the plurality of light-transmitting portions 11b. The light-absorbing-portion material layer 11aR is formed from a material containing, for example, a curable resin that is yet to be cured and a black filler. The curable resin serves as a base resin.

Figure 3D:
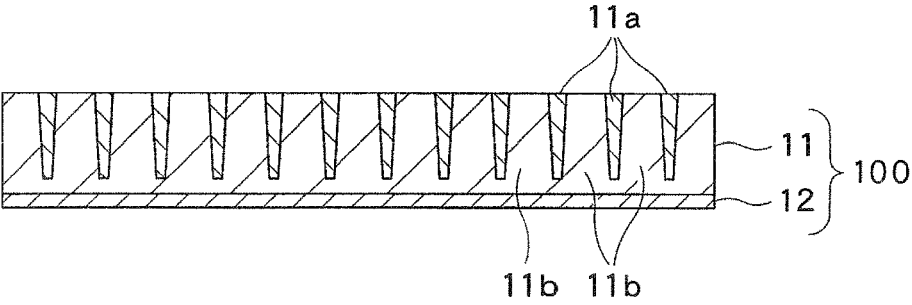
FIG. 3D illustrates the exemplary method of manufacturing the optical sheet illustrated in FIG. 1.

Subsequently, as illustrated in FIG. 3D, with the recesses 14 being filled with the light-absorbing-portion material layer 11aR, an excessive portion of the light-absorbing-portion material layer 11aR is scraped off by using a squeegee or the like. Then, the light-absorbing-portion material layer 11aR is cured, whereby the light-absorbing portions 11a are obtained. Thus, a multilayer sheet 100, which includes the optical function layer 11 and the base 12, is obtained.

Subsequently, as illustrated in FIG. 4A, the multilayer sheet 100 is wound into a roll. The lengthwise direction of the light-absorbing portions 11a and the light-transmitting portions 11b coincides with the lengthwise direction of the multilayer sheet 100, i.e., the winding direction.

Subsequently, as illustrated in FIG. 4B, the multilayer sheet 100 is fed from the roll, and quadrangular optical function films 10 are cut out by using a cutting die 200. The optical function films 10, each having a quadrangular shape defined by a pair of first sides 10a that are parallel to each other and a pair of second sides 10b that are parallel to each other, are cut from the multilayer sheet 100 such that the lengthwise direction of the light-absorbing portions 11a and the light-transmitting portions 11b, i.e., the second direction D2, is parallel to neither the first sides 10a nor the second sides 10b. Specifically, the cutting die 200, which has a quadrangular blade, is positioned in such a manner as not to be parallel to the lengthwise direction of the multilayer sheet 100.

Through the above steps, the optical function film 10 illustrated in FIG. 5A is obtained. Subsequently, as illustrated in FIG. 5B, a first protection film 20A and a second protection film 20B are prepared and are respectively attached to the two major surfaces of the optical function film 10. Thus, the optical sheet 1 illustrated in FIG. 5C is obtained, in which the first protection film 20A and the second protection film 20B extending externally beyond at least a part of the periphery of the optical function film 10 are attached to each other, and a portion of the first protection film 20A and a portion of the second protection film 20B that are beyond at least the part of the periphery of the optical function film 10 include a portion of a first adhesive layer 22A and a portion of a second adhesive layer 22B, respectively.

<Exemplary Usage of Optical Sheet 1>

An exemplary usage of the optical sheet 1 is described. FIG. 6 schematically illustrates a liquid-crystal display apparatus including the optical function film 10 obtained by removing the first protection film 20A and the second protection film 20B from the optical sheet 1. The optical function film 10 is set in the liquid-crystal display apparatus after the first protection film 20A and the second protection film 20B are removed from the optical sheet 1 in a factory or any other location. The liquid-crystal display apparatus illustrated in FIG. 6 includes a light source 2, a prism sheet 3, a reflective polarization-splitting sheet 30, the optical function film 10, a liquid-crystal panel 50, and a visibility-adjusting sheet 60 that are placed one on top of another in the order listed.

<Functions and Effects>

The optical sheet 1 according to the present embodiment described above includes the optical function film 10 and the protection film 20. The optical function film 10 includes the optical function layer 11. The optical function layer 11 includes the optical-element portions (11a and 11b) that are of two or more different kinds and are arrayed in one direction. The protection film 20 includes the protection layer 21 and the adhesive layer 22. The protection film 20 is peelably provided on at least one of the pair of major surfaces of the optical function film 10 with the adhesive layer 22. The protection film 20 extends externally beyond at least a part of the periphery of the optical function film 10. In the protection film 20, a portion that is beyond at least the part of the periphery of the optical function film 10 includes a portion of the adhesive layer 22.

In such a configuration, any burrs on the end faces of the optical function film 10 that may fall off to be regarded as foreign matter or any other existing foreign matter on the end faces of the optical function film 10 is less likely to fall off the optical function film 10, because such matter is held by the portion of the protection film 20 that is beyond the optical function film 10, particularly by the adhesive layer 22. Furthermore, when the protection film 20 is removed from the optical function film 10, such possible foreign matter or existing foreign matter on the end faces of the optical function film 10 tends to adhere to the adhesive layer 22 included in the portion beyond the periphery. Such a configuration reduces the probability that foreign matter possibly generated from the optical function film 10 unwantedly scatters, for example, inside an image display apparatus. Specifically, in a situation such as the one illustrated in FIG. 6 where the optical function film 10 has been set in a liquid-crystal display apparatus or the like, there is a reduced probability of foreign matter possibly generated from the optical function film 10 unwantedly scattering, for example, inside the liquid-crystal display apparatus. Thus, effects that may be brought to the quality of the liquid-crystal display apparatus or the like is avoided.

Note that the possible foreign matter or existing foreign matter described above tends to be generated in the step of cutting out optical function films 10 that is illustrated in FIG. 4B.

In the present embodiment, the protection film 20 extends externally beyond the entire periphery of the optical function film 10. Thus, the reliability of the protection film 20 as a function of suppressing the scattering of foreign matter is improved.

The protection film 20 is one of a pair of the first protection film 20A and the second protection film 20B that are respectively provided on the pair of major surfaces of the optical function film 10. Furthermore, the periphery of the first protection film 20A and the periphery of the second protection film 20B are peelably joined to each other. Thus, the reliability of the first protection film 20A and the second protection film 20B as a function of suppressing the scattering of foreign matter is improved. Furthermore, the reliability of the function as a protection from impact, contamination, and other incidents is effectively increased.

The first protection film 20A and the second protection film 20B each extend beyond the periphery of the optical function film 10 within a range between 1 mm and 100 mm inclusive (preferably 1 mm or greater and 10 mm or smaller). Thus, while a reduction in the ease of handling that may be caused by an excessive increase in the size of the protection film is avoided, the periphery of the optical function film 10 is sufficiently covered by the first protection film 20A and the second protection film 20B.

The first protection film 20A and the second protection film 20B each have a Young's modulus of preferably 20 MPa or higher and 110 MPa or lower. In another respect, the first protection film 20A and the second protection film 20B each have a flexural rigidity of preferably 1000 MPa·m$^4$ or higher and 2000 MPa·m$^4$ or lower. Such conditions provide an appropriate degree of flexibility to the first protection film 20A and the second protection film 20B, making it easy for the first protection film 20A and the second protection film 20B to cover the periphery of the optical function film 10.

In the present embodiment, the optical function film 10 is a louver film and includes the light-absorbing portions 11a and the light-transmitting portions 11b that are alternately arrayed. Furthermore, the light-absorbing portions 11a contain light-absorbing particles. In a typical louver film, the light-transmitting portions have a higher refractive index than the light-absorbing portions. Accordingly, the light-transmitting portions are harder than the light-absorbing portions. Such a configuration increases the probability that possible foreign matter is generated in the cutting step. Moreover, the light-absorbing portions containing light-absorbing particles are more likely to generate possible foreign matter in the cutting step. In this respect, employing the optical sheet 1 according to the present embodiment produces a noticeably higher efficiency percentage in the production of an apparatus into which the optical function film is to be incorporated, than in a case where a protection film is attached to an optical function film such that the protection film is flush with the optical function film. Consequently, a great advantage is brought to the manufacturing site.

MODIFICATIONS

Modifications of the above embodiment are described.

FIG. 7 illustrates a first modification, which is different from the above embodiment in the configuration of layers included in the optical function film 10. Specifically, an optical function film 10 according to the first modification includes a back-side base 16 (corresponding to the first base), a reflective polarization layer 17, a bonding layer 18, an optical function layer 11, and a base 12 (corresponding to the second base), which are stacked in the order listed. The optical function layer 11 and the base 12 are the same as those described in the above embodiment. The first protection film 20A covers the base 12. The second protection film 20B covers the back-side base 16.

The greater the number of layers included in the optical function film 10, the higher the probability that possible foreign matter is generated on the end faces of the optical function film 10 in the cutting step. In this respect, the first modification effectively reduces the probability of foreign matter possibly generated from the optical function film 10 scattering in the liquid-crystal display apparatus or the like.

FIG. 8 illustrates a second modification, which is different from the above embodiment in the configuration of layers included in the optical function film 10. Specifically, the optical function film 10 according to the second modification is provided with the protection film 20 only on one side thereof. The protection film 20 hangs down from the periphery of the optical function film 10. The adhesive layer 22 of the protection film 20 is not attached to the periphery of the optical function film 10.

In the second modification as well, any burrs on the end faces of the optical function film 10 that may fall off to be regarded as foreign matter or any other existing foreign matter on the end faces of the optical function film 10 is less likely to fall off, with the presence of the protection film 20. Furthermore, when the protection film 20 is removed, such possible foreign matter or existing foreign matter on the end faces of the optical function film 10 tends to adhere to the adhesive layer 22 included in the portion beyond the periphery. Such a configuration reduces the probability of foreign matter possibly generated from the optical function film 10 unwantedly scattering, for example, inside an image display apparatus.

FIG. 9 illustrates a third modification, in which the optical function film 10 is provided with the protection film 20 only on one side thereof, similarly to the second modification. However, the protection film 20 is attached to the end faces of the optical function film 10.

The third modification configured as above has an increased effect of suppressing the scattering of foreign matter.

FIG. 10 illustrates a fourth modification, which is different from the above embodiment in the forms of the first protection film 20A and the second protection film 20B. Specifically, in the fourth modification, the periphery of the first protection film 20A extends externally beyond the periphery of the second protection film 20B. Preferably, the first protection film 20A extends beyond the second protection film 20B by 1 mm or greater.

The fourth modification provides ease of separation, from each other, of the first protection film 20A and the second protection film 20B, which have been joined to each other.

FIG. 11 illustrates a fifth modification, which is different from the above embodiment in the forms of the first protection film 20A and the second protection film 20B. Specifically, in the fifth modification, the first protection film 20A and the second protection film 20B each extend beyond the optical function film 10 only in part (on two sides) of the optical function film 10.

FIG. 12 illustrates a sixth modification, in which the optical function film 10 is not a louver film but a so-called wide-view film. In the optical function film 10 serving as a wide-view film, the optical function layer 11 includes a high-refractive-index layer 11H and a low-refractive-index layer 11L. The interface between the high-refractive-index layer 11H and the low-refractive-index layer 11L has a rugged shape (concave and convex shape). The base 12 is provided on one side of the high-refractive-index layer 11H with a bonding layer 19 interposed therebetween, the one side being opposite from the other side thereof where the low-refractive-index layer 11L is provided.

The layer formed of the high-refractive-index layer 11H and the low-refractive-index layer 11L is more likely to generate possible foreign matter in the cutting step, because one of the two layers is harder than the other. In the sixth modification, the first protection film 20A and the second protection film 20B effectively suppress the scattering of foreign matter. The optical function film 10 may be any film other than a louver film or a wide-view film.

Next, a modification of the manufacturing method according to the above embodiment is described with reference to FIGS. 13A to 13E.

FIG. 13A illustrates a multilayer sheet 110, in which a first initial protection layer 24, the optical function layer 11, the base 12, and a second initial protection layer 25 are stacked in the order listed. In the present modification, as illustrated in FIGS. 13B and 13C, the cutting die 200 is used to cut out an optical function film 10 provided with the initial protection layers.

Subsequently, as illustrated in FIG. 13D, the first initial protection layer 24 and the second initial protection layer 25 are removed from the optical function film 10. Then, as illustrated in FIG. 13E, a first protection film 20A and a second protection film 20B are prepared and are attached to the optical function film 10. Note that a process such as a test of the optical function film 10 may be conducted after the first initial protection layer 24 and the second initial protection layer 25 are removed from the optical function film 10.

EXAMPLES

A working example of the present disclosure and a comparative example are described. The present disclosure is not limited to the following working example.

Working Example

An optical sheet 1 including the layers configured as illustrated in FIG. 1 was manufactured as a working example.

The light-absorbing portions 11*a* of the optical function layer 11 included in the optical function film 10 were formed from a material (the light-absorbing-portion material layer 11*a*R) obtained as a mixture of the following: a base resin containing thermosetting urethane acrylate and organic silicone resin, and carbon black of 5% by weight with respect to the total amount of the material.

The light-transmitting portions 11*b* were formed from ultraviolet-curable urethane acrylate (the light-transmitting-portion material layer 11*b*R).

The base 12 included in the optical function film 10 was formed from a polycarbonate film (CARBOGLASS film C110 from AGC Inc.) having a thickness of 100 μm.

The protection film 20 was formed from a protection film (EC-7520 from Sumiron Co., Ltd.) having a thickness of 43 μm and including a protection layer 21 made of polypropylene and an adhesive layer 22 made of acrylic-based adhesive.

In the working example, a multilayer sheet 100, in which the optical function film 10 and the base 12 were stacked, was first made as follows.

For making the multilayer sheet 100, ultraviolet-curable urethane acrylate (the light-transmitting-portion material layer 11*b*R) for forming the light-transmitting portions 11*b* was provided on the base 12, and recesses 14 were provided in the ultraviolet-curable urethane acrylate by using a roll die such that a land portion 11*c* (see FIG. 1) of 25 μm were formed. The roll die having projections with a height of 102 μm was used so as to obtain recesses 14 with a depth of 102 μm, that is, light-absorbing portions 11*a* with a height of 102 μm. The pitch of the projections was set to 39 μm.

Subsequently, the recesses 14 were filled with a thermosetting resin containing carbon black (the light-absorbing-portion material layer 11*a*R), and an excessive portion of the light-absorbing-portion material layer 11*a*R was scraped off by using a squeegee or the like. Then, the light-absorbing-portion material layer 11*a*R was cured with heat. Thus, a multilayer sheet 100 was obtained.

Subsequently, a quadrangular optical function film 10 was cut from the multilayer sheet 100 by using a press-cutter. Then, protection films 20 were attached to the optical function film 10. The protection films 20 each extend beyond all sides of the optical function film 10 by 10 mm.

Comparative Example

An optical sheet manufactured as a comparative example included the layers illustrated in FIG. 1. However, the protection films do not extend beyond the optical function film.

In the comparative example, a multilayer sheet 100 that is the same as the one used in the working example was used. However, protection films were attached to the multilayer sheet 100 before cutting was performed. Then, a quadrangular optical function film was cut from the multilayer sheet 100 having the protection films thereon by using a press-cutter. Hence, the protection films were flush with the optical function film.

EVALUATION

The working example and the comparative example were evaluated by examining whether burrs on the end faces of the optical function film that might fall off to be regarded as foreign matter adhered to the protection films or stayed on the optical function film when the protection films were removed from the optical function film.

In the working example, when the protection films 20 were removed from the optical function film 10, some foreign matter was found on the protection films 20. In the comparative example, no foreign matter was found on the protection films removed from the optical function film, and burrs that might fall off to be regarded as foreign matter were found staying on the end faces of the optical function film.

The above result has demonstrated that possible foreign matter or existing foreign matter on the end faces of the optical function film 10 tends to adhere to the adhesive layers 22 in the portions beyond the periphery when the protection films 20 are removed from the optical function film 10. Thus, the present disclosure has been confirmed to produce an effect of suppressing the scattering of foreign matter.

The invention claimed is:

1. An optical sheet comprising:

an optical function film including an optical function layer, the optical function layer including optical-element portions that are of two or more different kinds and are arrayed in one direction; and a protection film including a protection layer and an adhesive layer, the protection film being peelably provided on at least one of a pair of major surfaces of the optical function film with the adhesive layer, wherein the protection film extends externally beyond at least a part of a periphery of the optical function film within a range between 1 mm and 100 mm, inclusive, wherein the protection film includes a pair of protection films that are respectively provided on the pair of major surfaces of the optical function film, wherein, in each of the pair of protection films, a portion that is beyond at least the part of the periphery of the optical function film includes a portion of the adhesive layer, wherein a periphery of one of the pair of protection films and a periphery of another of the pair of protection films are peelably joined to each other, and wherein a gap surrounded by the peripheries of the pair of protection films and the optical function film is provided, and the adhesive layer is exposed in the gap.

2. The optical sheet according to claim 1, wherein the protection film extends externally beyond an entirety of the periphery of the optical function film.

3. The optical sheet according to claim 1, wherein the periphery of the one of the protection films extends externally beyond the periphery of the other of the protection films.

4. The optical sheet according to claim 1, wherein the optical function film has a thickness of 0.2 mm or greater and 0.6 mm or smaller.

5. The optical sheet according to claim 1, wherein the protection film has a Young's modulus of 20 MPa or higher and 110 MPa or lower.

6. The optical sheet according to claim 1, wherein the protection film has a flexural rigidity of 1000 MPa·m$^4$ or higher and 2000 MPa·m$^4$ or lower.

7. The optical sheet according to claim 1, wherein the optical function film is a louver film, and the optical-element portions include light-absorbing portions and light-transmitting portions that are alternately arrayed.

8. The optical sheet according to claim 7, wherein the light-absorbing portions each contain a base resin and light-absorbing particles that are held by the base resin.

9. The optical sheet according to claim 1, wherein the optical function film includes a base and the optical function layer that are stacked in an order listed.

10. The optical sheet according to claim 1, wherein the optical function film includes a first base, a reflective polarization layer, a bonding layer, the optical function layer, and a second base that are stacked in an order listed.

11. The optical sheet according to claim 1, wherein the optical-element portions each extend linearly in a direction different from the one direction, and wherein the optical function film has a quadrangular shape defined by a pair of first sides that are parallel to each other and a pair of second sides that are parallel to each other, and the direction different from the one direction is parallel to neither the first sides nor the second sides.

12. A method of manufacturing an optical sheet, comprising:

a step of preparing an optical function film including an optical function layer, the optical function layer including optical-element portions that are of two or more different kinds and are arrayed in one direction;

a step of preparing a first protection film and a second protection film, each including a protection layer and an adhesive layer; and a step of peelably attaching the first protection film to one of a pair of major surfaces of the optical function film with the adhesive layer, and peelably attaching the second protection film to another of the pair of major surfaces of the optical function film with the adhesive layer, wherein each protection film is attached such that each protection film extends externally beyond at least a part of a periphery of the optical function film, wherein, in each protection film, a portion that is beyond at least the part of the periphery of the optical function film includes a portion of the adhesive layer, and a periphery of the first protection film and a periphery of the second protection film are peelably joined to each other such that a gap surrounded by the peripheries of the pair of protection films and the optical function film is provided and the adhesive layer is exposed in the gap, wherein the step of preparing the optical function film is performed by cutting the optical function film from a multilayer sheet including the optical function layer, such that the optical function film has a quadrangular shape, wherein the optical-element portions each extend linearly in a direction that is different from the one direction, and wherein the optical function film is cut from the multilayer sheet such that the quadrangular shape of the optical function film is defined by a pair of first sides that are parallel to each other and a pair of second sides that are parallel to each other, and such that the direction that is different from the one direction is not parallel with respect to the first sides or with respect to the second sides.

13. A method of manufacturing an optical sheet, comprising:

a step of making a multilayer sheet in which an optical function layer and an initial protection layer are stacked, the optical function layer including optical-element portions that are of two or more different kinds and are arrayed in one direction;

a step of cutting an optical function film from the multilayer sheet, the optical function film including the optical function layer and the initial protection layer;

a step of preparing a first protection film and a second protection film, each including a protection layer and an adhesive layer; and a step of peelably attaching, after the initial protection layer is removed, the protection film to at least one of a pair of major surfaces of the optical function film with the adhesive layer, wherein each protection film is attached such that each protection film extends externally beyond at least a part of a periphery of the optical function film within a range of 1 mm to 100 mm, inclusive, and wherein, in each protection film, a portion that is beyond at least the part of the periphery of the optical function film includes a portion of the adhesive layer, and a periphery of the first protection film and a periphery of the second protection film are peelably jointed to each other such that a gap surrounded by the peripheries of the pair of protection films and the optical function film is provided and the adhesive layer is exposed in the gap.

* * * * *